(12) United States Patent
Sing

(10) Patent No.: US 8,172,478 B2
(45) Date of Patent: May 8, 2012

(54) DOUBLE-DECK COVERED ROADWAY

(76) Inventor: Robert L. Sing, Kamuela, HI (US)

( * ) Notice: Subject to any disclaimer, the term of this patent is extended or adjusted under 35 U.S.C. 154(b) by 96 days.

(21) Appl. No.: 12/451,889

(22) PCT Filed: Mar. 5, 2008

(86) PCT No.: PCT/US2008/002881
§ 371 (c)(1),
(2), (4) Date: Dec. 4, 2009

(87) PCT Pub. No.: WO2008/150317
PCT Pub. Date: Dec. 11, 2008

(65) Prior Publication Data
US 2010/0104360 A1    Apr. 29, 2010

Related U.S. Application Data

(60) Provisional application No. 60/924,960, filed on Jun. 6, 2007.

(51) Int. Cl.
*E01C 1/00*    (2006.01)
(52) U.S. Cl. ........................................... 404/1; 340/928
(58) Field of Classification Search ........ 404/1; 52/175; 340/910, 917–919, 928
See application file for complete search history.

(56) References Cited

U.S. PATENT DOCUMENTS

| | | | | |
|---|---|---|---|---|
| 1,784,728 A | * | 12/1930 | Harriss | 404/1 |
| 2,160,315 A | * | 5/1939 | Prince | 404/1 |
| 2,225,186 A | * | 12/1940 | Sorensen | 404/1 |
| 3,272,096 A | * | 9/1966 | Lum | 404/1 |
| 5,655,244 A | | 8/1997 | Minakami et al. | |
| 5,846,020 A | | 12/1998 | McKeown | |
| 5,897,270 A | | 4/1999 | Barel | |
| 6,121,880 A | | 9/2000 | Scott et al. | |
| 6,342,844 B1 | | 1/2002 | Rozin | |
| 6,411,889 B1 | | 6/2002 | Mizunuma et al. | |
| 6,561,727 B1 | * | 5/2003 | Gustafson, Jr. | 404/1 |
| 6,676,330 B2 | | 1/2004 | Stamm et al. | |
| 6,752,563 B2 | | 6/2004 | Ide | |
| 2003/0195670 A1 | * | 10/2003 | Smith et al. | 701/1 |
| 2004/0091313 A1 | | 5/2004 | Zhou | |
| 2004/0148717 A1 | | 8/2004 | Kornatsky | |
| 2006/0017587 A1 | * | 1/2006 | Park et al. | 340/988 |
| 2006/0216111 A1 | | 9/2006 | Jacky | |
| 2007/0273552 A1 | * | 11/2007 | Tischer | 340/910 |

FOREIGN PATENT DOCUMENTS

| | | |
|---|---|---|
| FR | 2715950 | 8/1995 |
| JP | 7-003721 | 1/1995 |
| KR | 2000-0006907 | 4/2000 |
| KR | 10-0281224 | 11/2000 |
| RU | 2192514 | 8/1995 |
| RU | 2198977 | 2/2003 |

* cited by examiner

*Primary Examiner* — Thomas Will
*Assistant Examiner* — Matthew D Troutman
(74) *Attorney, Agent, or Firm* — Richard C. Litman

(57) ABSTRACT

The double-deck covered roadway (5) has an upper road (30) for light vehicle traffic and a lower road (25) for heavy, industrial vehicle traffic. The roadway is an intelligent system, having an access control computer (ACC) (55) limiting access of the roadways to the appropriate vehicles. Signal emitters, receivers and/or repeaters (40) for microwave, cell phones short-range radio, or the like may be provided. The roadway is covered, and has a slanted roof structure (7). Solar panels (10) are disposed atop the slanted roof structure (7). Spindles (8) may be provided that can pull off or pull on an optional protective cover for the solar panels (10). An indoor services module (50) houses the ACC (55) and other service systems. The underside of the upper roadway (30) can provide attached or embedded monitoring systems, road lighting, signal light boards (60) to communicate with drivers, etc.

18 Claims, 4 Drawing Sheets

DOUBLE-DECK COVERED ROADWAY

CROSS REFERENCE TO RELATED APPLICATIONS

This application is a national stage (35 U.S.C. §371) of PCT/US 2008/002881, filed Mar. 5, 2008, which in turn claims the benefit of Provisional Patent Application 60/924,960, filed Jun. 6, 2007, titled Double-Deck Covered Roadway.

TECHNICAL FIELD

The present invention relates generally to roadway systems, and more specifically to a double-deck covered roadway that provides a two-level covered roadway system designed to keep light vehicle traffic, such as passenger cars, bicycles, wheelchairs, and the like, separated from heavy vehicle traffic, such as multi-axle trucks, trucks exceeding a predetermined gross vehicle weight, transporters of hazardous materials, and the like.

BACKGROUND ART

Traffic congestion is a worldwide problem. The problem is exacerbated by the ever increasing number of automobiles, trucks, bicycles, and the like that share the roadway infrastructure. High volume traffic comprising the aforementioned variety of vehicle types increases the likelihood of congestion, injury due to accidents, and the consequent negative impact on society's economic growth as the demand for goods and services causes roadway system capacities to be exceeded on a daily basis. Daily gridlock on the roadways is not confined to large cities. Moreover, the stagnation of traffic negatively impacts every member of society in a variety of ways, which include economic, health, social and other factors. Hence, economic growth can be fostered by a more efficient roadway system capable of marshalling vehicle access to the roadway levels based on vehicle type.

Notwithstanding the expansion of e-commerce, products must still be transported, and at some point in the product fulfillment phase, the products are likely to have been transported via roadway to the purchaser.

The much sought after 'holy grail' of highway systems is to provide a system that substantially increases the flow of traffic in a cost effective manner. While two-level roadway structures currently exist, the existing structures do not provide a comprehensive vehicle management and information system that effectively enforces access of only permitted vehicle types according to the roadway level being used. However, such a system would greatly increase a level of safety that would be enjoyed by all users of the roadway.

Notwithstanding current roadway systems, there remains a need for a roadway system that vastly reduces traffic congestion while smoothing vehicular flow. Along with a substantial decrease in traffic congestion, it is desirable to provide a safer driving environment for a much wider range of vehicles and under a wide variety of environmental/weather conditions.

Thus, a double-deck covered roadway solving the aforementioned problems is desired.

DISCLOSURE OF INVENTION

The double-deck covered roadway has an upper road for light vehicle traffic and a lower road for heavy, industrial vehicle traffic. The roadway is intelligent and has an access control computer that limits access of the roadways to the appropriate vehicles. Signal emitters, receivers and/or repeaters for microwave, cell phones short-range radio, or the like may be provided. The roadway is covered, and has a slanted roof structure. Solar panels are disposed atop the slanted roof structure. Spindles may be provided that can pull off or pull on an optional protective cover for the solar panels. An indoor services module space houses the access control computer (ACC) and other service systems. Support columns are provided to support the double-deck roadway structure and housing. The underside of the upper roadway can provide attached or embedded monitoring systems, road lighting, signal light boards to communicate with drivers, etc. Scannable permits provide vehicle access to the appropriate road level.

These and other features of the present invention will become readily apparent upon further review of the following specification and drawings.

BRIEF DESCRIPTION OF THE DRAWINGS

Similar reference characters denote corresponding features consistently throughout the attached drawings.

BEST MODES FOR CARRYING OUT THE INVENTION

Figure 1:
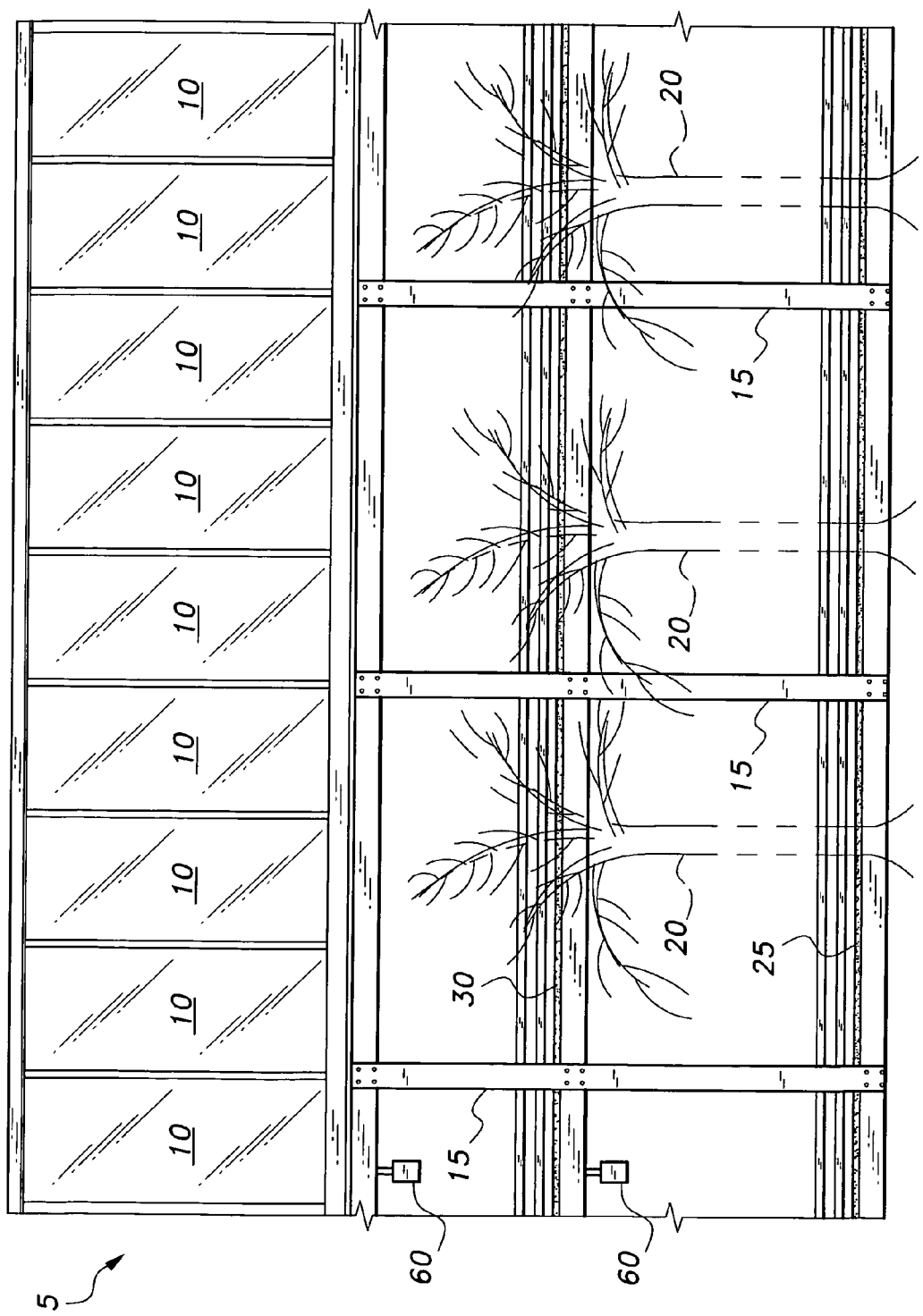
FIG. 1 is an environmental side view of the double-deck covered roadway according to the present invention.
Figure 2:
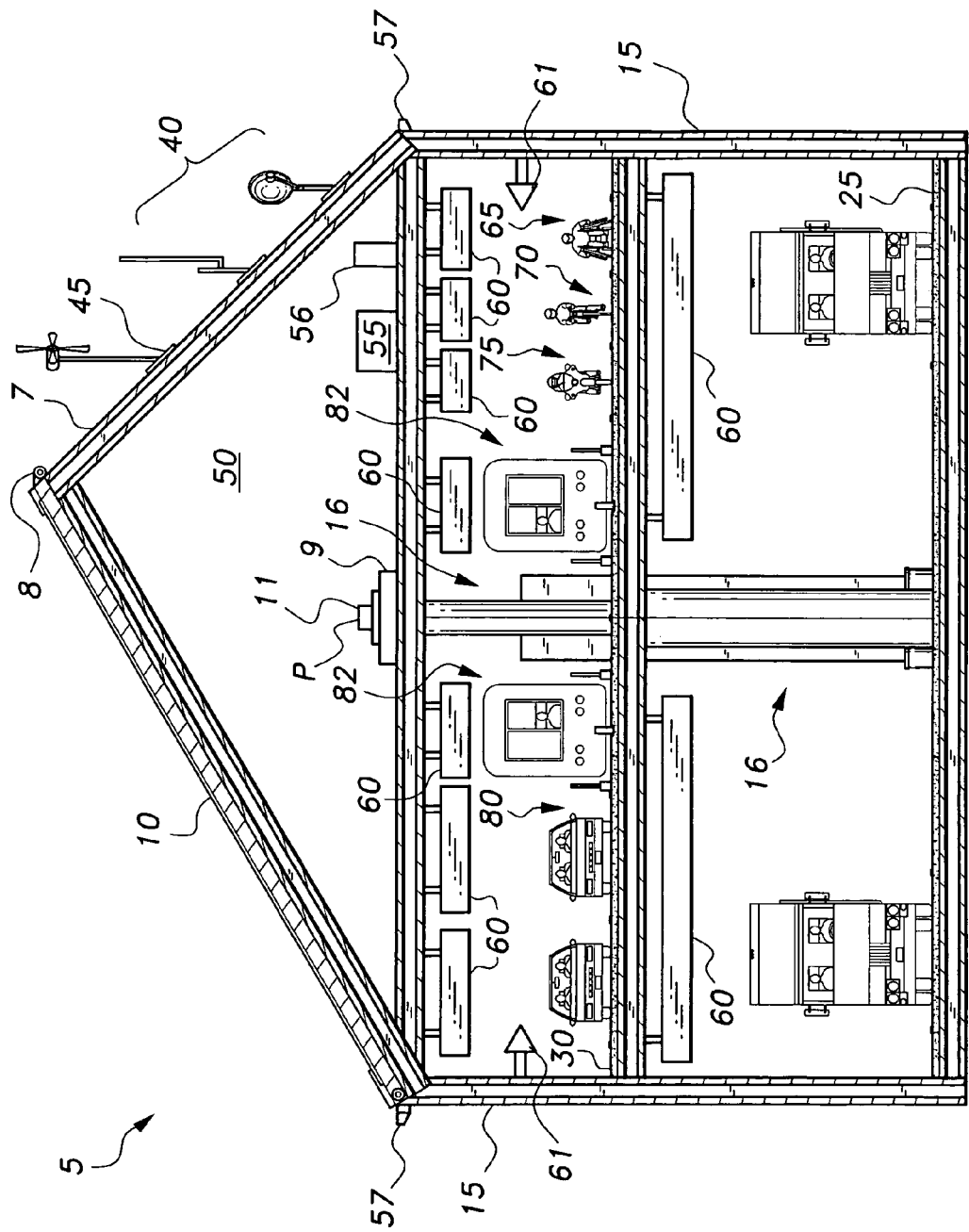
FIG. 2 is a front section view of the double-deck covered roadway according to the present invention.

As shown in FIGS. 1-2, the present invention is a double-deck covered roadway 5 that has an upper road 30 for light vehicle traffic and a lower road 25 for heavy, industrial vehicle traffic and heavier/larger passenger vehicles. The roadway 5 is an intelligent system and has an access control computer (ACC) 55 that can limit access of the upper road 30 and the lower road 25 to the corresponding vehicles appropriate to the respective road 30 or 25. Signal emitters, receivers and/or repeaters 40 for microwave, cell phones short-range radio, or the like may also be provided.

Solar panels 10 are disposed atop a gabled or slanted roof structure 7. The roof structure 7 provides protection of roadway 5 from inclement weather, and the like. There may be spindles 8 that can pull off or pull on optional protective covers for the solar panels 10. An indoor services module space 50 houses the access control computer (ACC) 55 and other service systems described herein.

Support columns 15 are provided to support the two roads 25 and 30, as well as roof structure 7. At least one central support column 16 provides sufficient structural support for a rail car system 82 disposed on either side. The rail car system 82 is preferably a light duty passenger rail car system. The underside of the upper roadway can provide attached or embedded monitoring systems, road lighting, and signal light boards 60 to communicate with drivers, or the like. The double-deck covered roadway 5 may be constructed in a modular fashion.

By utilizing all of the systems described herein, traffic congestion may be relieved, while smooth vehicular flow may be achieved. A safe environment for a much wider range of vehicles may be provided by the double-deck covered roadway 5.

Figure 3:
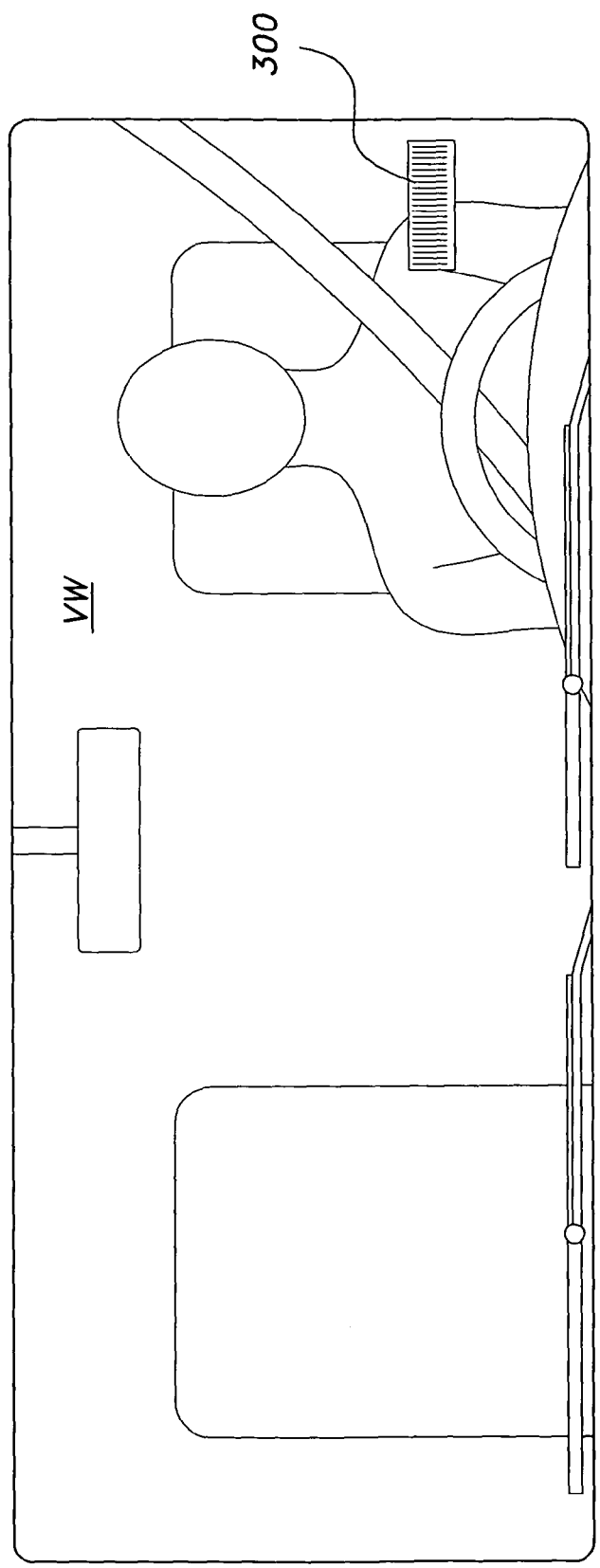
FIG. 3 is a diagrammatic environmental front view of a permit sticker affixed to a vehicle windshield for access to a double-deck covered roadway according to the present invention.

The roadway 5 divides vehicular traffic into two categories: those that have the appropriate permits 300 (as shown in FIG. 3) to travel on the upper road 30, which can be constructed over an existing road, or as part of a project that builds both the lower road 25 and the upper road 30; and those that do not have the appropriate permits 300. Permits 300 are available to vehicles below a stated weight. Permits 300 may be comprised of scannable symbols, such as a bar code, and/or may be equipped with a microchip, RFID (radio frequency identification) tag, or the like. Alternatively, a permit 300 may also be disposed on a vehicle license plate. The ACC 55 can, in real-time, direct groups of vehicles and individual vehicles into a desired traffic pattern based on the scannable device information relayed to the ACC 55.

During the first one to three years, when traffic on the upper road is light, the Department of Transportation (DOT) or other regulatory or enforcement department or agency could elect to broaden the permitted weight range somewhat. Hybrid vehicles and other environment friendly vehicles of moderate weight could travel on the upper road 30.

Figure 4:
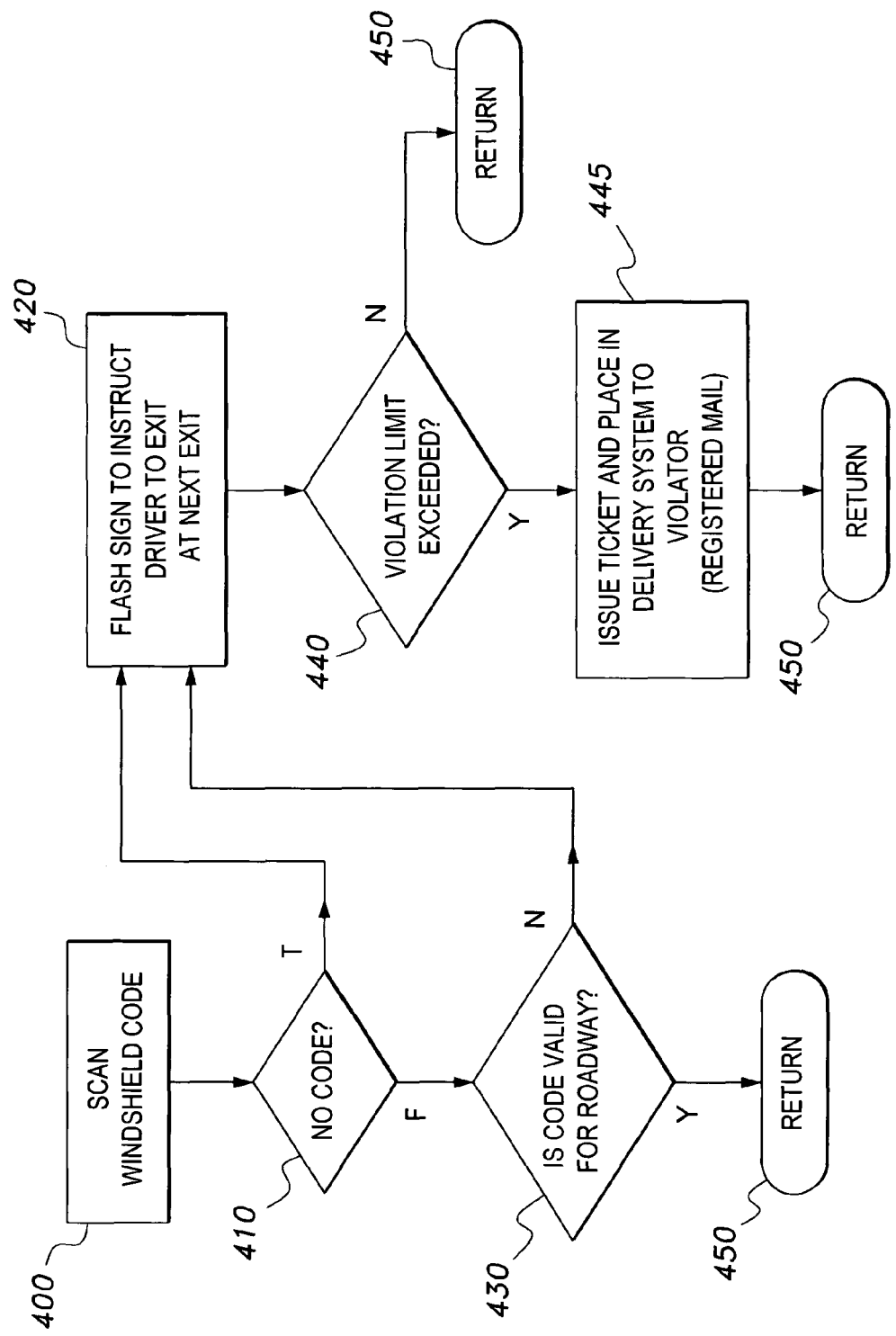
FIG. 4 is a flowchart of permit sticker scanning logic of the double-deck covered roadway according to the present invention.

The permit 300 is a small sticker including a bar code, RFID tag, microchip, or other device compatible with a scanner. This would be placed in the upper left or lower left corner of the inner surface of windshield VW. As shown at step 400 in FIG. 4, the roadway 5 has the capability to scan permit 300. As shown at steps 410, 420 and 430, if the vehicle displays no permit 300, a flashing sign instructs the driver to exit at the next off-ramp. As shown at steps 440 and 445, if more than a predetermined number of violations, e.g., three (or other number chosen by the DOT) within a predetermined period, such as thirty days, has been exceeded, an appropriate traffic ticket can be issued and sent by registered mail to the offending vehicle owner. Scan processing returns to other functions of the access control computer 55 at step 450.

Heavier vehicles are not permitted on upper road 30 because they generate greater momentum at any speed than do the smaller lighter vehicles, are designed for higher speeds, and can give their drivers some sense of invulnerability, which may be exaggerated but nevertheless dangerous, particularly for the occupants of the smaller vehicles. The results of these facts are that many drivers feel pressure to buy larger vehicles, although they would prefer to buy smaller ones because they are cheaper to buy and operate, are more maneuverable, easier to park, and environment friendly.

Permitted vehicles would be small automobiles and trucks, hybrids and medium-size autos, motorcycles, motor scooters, mopeds, bicycles of various types (some pulling small trailers containing one or two small children, a single adult, or freight of various types), and various vehicles operated by persons with disabilities.

On the upper road level 30, bicycles and vehicles for the disabled are directed to travel in their own lane 65 or 70, which can be narrower than those for the other traffic. For safety, these lanes may be separated from the other traffic by an appropriate barrier. Moreover, a separate motorcycle road area 75 and a separate car road area 80 may be provided by the double-deck covered roadway 5.

Traffic on lower road 25 is composed of heavier and larger automobiles, vans, larger and large trucks, buses service vehicles, and the like, and due to the enforced separation of vehicle types, such vehicles will be able to move faster, in a smoother traffic pattern. The traffic can be monitored by equipment attached to, or embedded in, the underside of the upper road 30. Speeding, racing, tailgating, erratic driving, lane hopping, cutting off traffic, as well as vehicles having excessive exhausts or which exceed acceptable noise levels, can be warned and or ticketed by appropriate regulatory or enforcement personnel monitoring the roadway 5.

In extreme situations, offending vehicles can be trapped by control systems monitoring the roadway 5, which can direct traffic ahead to slow down and move into one lane, which can then be stopped altogether, if necessary. The traffic of the lower road 25 and the traffic of the upper road 30, considered overall, will be smoother, safer, and faster, with fewer episodes of road rage.

The inherent advantages of the intelligent double-deck covered roadway 5 will become rapidly accepted by most of the vehicle owners, since it relieves traffic congestion, while creating a safer driving environment.

These desirable results will become more and more pervasive as the coming move towards environmentally positive traffic develops. The double-deck covered roadway 5 will contribute to, and benefit from, this trend. As shown in FIG. 2, the features of the roadway 5 can be greatly expanded by the services module 50 over the upper road 30.

As indicated in FIG. 1 the roof 7 of the services module 50 can support an extensive array of solar photovoltaic panels 10, and provide a support 45 for an extensive array of wind-driven electric generators. Additionally, a catchment's storage system 57 is provided, along with water pump 56, to capture and use rainfall. The water can be used to water and feed plants 20 in the roadway landscaping, and to spray clean the solar panels 10. Mounts for wireless systems 40, such as cell phones, short-range radio wave distribution systems, or the like may be provided. Edges of the upper road deck 30 can provide support for a banner or pennant display mechanism 61 for displaying notices of holidays, sporting and cultural events historical themes, etc.

The services module space 50 can house service functions, such as lighting systems for the lower road 25 and the upper road 30. Wind generator, photovoltaic subsystems, as well as conduits for various applications, may be housed in the services module space 50. Additionally, fiber optic cables and telephone cables can be housed in the services module 50. Moreover, a system having, for example, a conveyor 9 and rollers 11 for transferring packages P may be housed in the services module 50.

In sub-tropical or other intense sun environments, the shade inherent in this system will be a significant comfort factor and protect the road surfaces themselves from sun-induced deterioration. The roadway 5 provides the whole community with an opportunity to have safe, orderly, enjoyable, and efficient travel.

Landscaping the views afforded by the upper road 30 and the humaneness of the process will create a uniquely positive travel/commute experience. It will serve the needs of a much broader segment of the population than is served by present roads.

Wherever this invention is used, it will help kick start that community into a new level of ecological efficiency and will serve as an encouraging example for others.

It is to be understood that the present invention is not limited to the embodiment described above, but encompasses any and all embodiments within the scope of the following claims.

The invention claimed is:
1. A double-deck covered roadway, comprising:
   a lower road and an upper road disposed above the lower road;

means for separating traffic flow of a first classification of vehicle to the lower roadway and traffic flow of a second distinct classification of vehicle to the upper roadway;

a services module disposed above the upper road, the services module having a services module floor;

a slanted roof disposed above the services module;

information display boards disposed above, and visible to, the traffic flow on both the lower road and the upper road;

an access control computer disposed in the services module, the access control computer being connected to the information display boards to provide traffic information and direction to vehicles in the upper and lower traffic flow;

a plurality of solar power panels disposed on the slanted roof, the solar power panels providing electric power for the services module;

a scannable device adapted for being disposed on a portion of each of the vehicles in the traffic flow;

scanners disposed to scan the scannable device as vehicles in the traffic flow enter and pass through the upper and lower roads, the scanners being connected to the access control computer, the access control computer having means for directing groups of individual vehicles into a desired traffic pattern in real time based on scannable device information relayed to the access control computer;

electronic sensor circuitry disposed in proximity to the roadway, the electronic sensor circuitry monitoring the vehicles in the traffic flow for compliance of traffic and noise rules;

wherein the electronic sensor circuitry is capable of detecting a vehicle in violation of the traffic and noise rules; and a control system connected to the electronic sensor circuitry, the control system directing the traffic flow into a pattern that enables the vehicle in violation of the traffic and noise rules to be trapped and apprehended.

2. The double-deck covered roadway according to claim 1, further comprising: indicators disposed in the roadway, the indicators dividing the roadway into a plurality of lanes, each lane being designated for a specific type of traffic modality.

3. The double-deck covered roadway according to claim 2, wherein one of the lanes is restricted to non-automotive vehicles for the disabled.

4. The double-deck covered roadway according to claim 2, wherein one of the lanes is restricted to human-powered vehicles.

5. The double-deck covered roadway according to claim 2, wherein one of the lanes is restricted to motorcycles.

6. The double-deck covered roadway according to claim 1, further comprising:
a plurality of spindles; and
protective covers attached to the plurality of spindles, the spindles removably placing the protective covers over the solar panels.

7. The double-deck covered roadway according to claim 1, further comprising a plurality of vertical support columns, each of the vertical support columns extending upward from the lower road to support the upper road and to support the services module floor.

8. The double-deck covered roadway according to claim 1, further comprising:
at least one central support column; and
a rail car system disposed on either side of the at least one central support column.

9. The double-deck covered roadway according to claim 1, further comprising roadway landscaping adjacent to the structure.

10. The double-deck covered roadway according to claim 1, further comprising:
supports for wind-powered generators, the supports being attached to the roof;
wind-powered generators attached to the wind-powered generator supports, the wind-powered generators supplying power to the services module.

11. The double-deck covered roadway according to claim 1, further comprising wireless telecommunications equipment disposed on the roof.

12. The double-deck covered roadway according to claim 1, further comprising:
a catchment storage system; and
a water pump, the water pump being operably connected to the catchment storage system.

13. The double-deck covered roadway according to claim 1, further comprising a banner display mechanism disposed along sidewalls of the upper deck, the banner display mechanism displaying notices to users of the roadway.

14. The double-deck covered roadway according to claim 1, further comprising: a package conveyor system disposed in the services module.

15. A double-deck covered roadway, comprising:
a lower road and an upper road disposed above the lower road;

means for separating traffic flow of a first classification of vehicle to the lower roadway and traffic flow of a second distinct classification of vehicle to the upper roadway;

a services module disposed above the upper road, the services module having a services module floor;

a slanted roof disposed above the services module;

information display boards disposed above, and visible to, the traffic flow on both the lower road and the upper road;

a banner display mechanism disposed along sidewalls of the upper deck, the banner display mechanism displaying notices to users of the roadway;

an access control computer disposed in the services module, the access control computer being connected to the information display boards to provide traffic information and direction to vehicles in the upper and lower traffic flow;

a scannable device adapted for being disposed on a portion of each of the vehicles in the traffic flow;

scanners disposed to scan the scannable device as vehicles in the traffic flow enter and pass through the upper and lower roads, the scanners being connected to the access control computer, the access control computer having means for directing groups of individual vehicles into a desired traffic pattern in real time based on scannable device information relayed to the access control computer;

electronic sensor circuitry disposed in proximity to the roadway, the electronic sensor circuitry monitoring the vehicles in the traffic flow for compliance of traffic and noise rules;

wherein the electronic sensor circuitry is capable of detecting a vehicle in violation of the traffic and noise rules; and a control system connected to the electronic sensor circuitry, the control system directing the traffic flow into a pattern that enables the vehicle in violation of the traffic and noise rules to be trapped and apprehended.

16. The double-deck covered roadway according to claim 15, further comprising a plurality of solar power panels disposed on the slanted roof, the solar power panels providing electric power for the services module.

17. A double-deck covered roadway, comprising:
a lower road and an upper road disposed above the lower road;
means for separating traffic flow of a first classification of vehicle to the lower roadway and traffic flow of a second distinct classification of vehicle to the upper roadway;
a services module disposed above the upper road, the services module having a services module floor;
a slanted roof disposed above the services module;
information display boards disposed above, and visible to, the traffic flow on both the lower road and the upper road;
an access control computer disposed in the services module, the access control computer being connected to the information display boards to provide traffic information and direction to vehicles in the upper and lower traffic flow;
a scannable device adapted for being disposed on a portion of each of the vehicles in the traffic flow;
scanners disposed to scan the scannable device as vehicles in the traffic flow enter and pass through the upper and lower roads, the scanners being connected to the access control computer, the access control computer having means for directing groups of individual vehicles into a desired traffic pattern in real time based on scannable device information relayed to the access control computer;
electronic sensor circuitry disposed in proximity to the roadway, the electronic sensor circuitry monitoring the vehicles in the traffic flow for compliance of traffic and noise rules;
wherein the electronic sensor circuitry is capable of detecting a vehicle in violation of the traffic and noise rules; and
a control system connected to the electronic sensor circuitry, the control system directing the traffic flow into a pattern that enables the vehicle in violation of the traffic and noise rules to be trapped and apprehended.

18. The double-deck covered roadway according to claim 17, further comprising a plurality of solar power panels disposed on the slanted roof, the solar power panels providing electric power for the services module.

* * * * *